March 15, 1966  E. J. HOLLER  3,240,583
METHOD AND APPARATUS FOR FORMING MULTIPLE-BORE TUBING
Filed Jan. 2, 1963  3 Sheets-Sheet 1

INVENTOR.
EDWARD J. HOLLER
BY W. A. Schaich &
E. J. Holler
ATTORNEYS

March 15, 1966        E. J. HOLLER        3,240,583

METHOD AND APPARATUS FOR FORMING MULTIPLE-BORE TUBING

Filed Jan. 2, 1963        3 Sheets-Sheet 2

INVENTOR.
EDWARD J. HOLLER
BY W. A. SCHAICH &
E. J. HOLLER
ATTORNEYS

March 15, 1966 E. J. HOLLER 3,240,583
METHOD AND APPARATUS FOR FORMING MULTIPLE-BORE TUBING
Filed Jan. 2, 1963 3 Sheets-Sheet 3
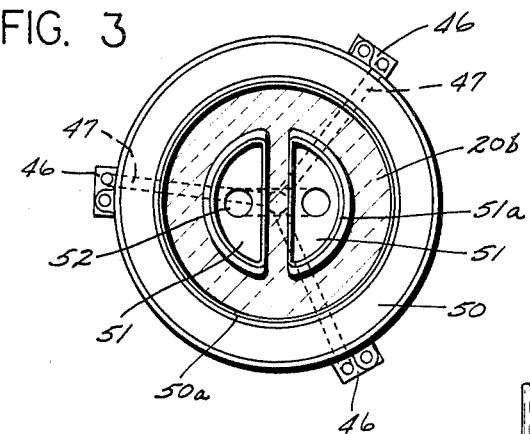
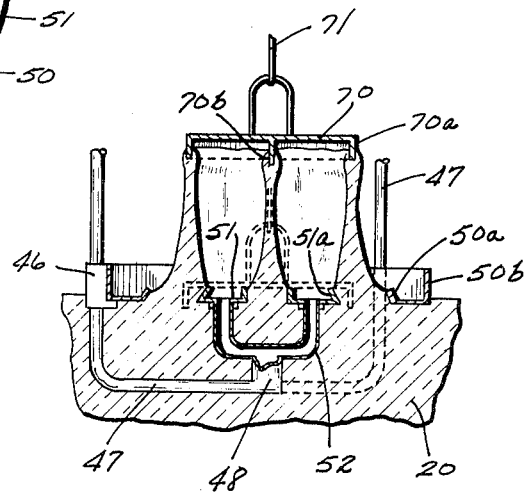
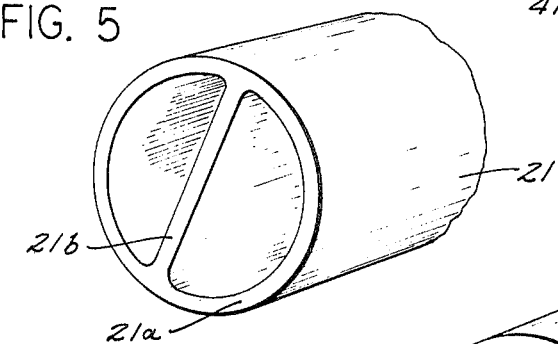
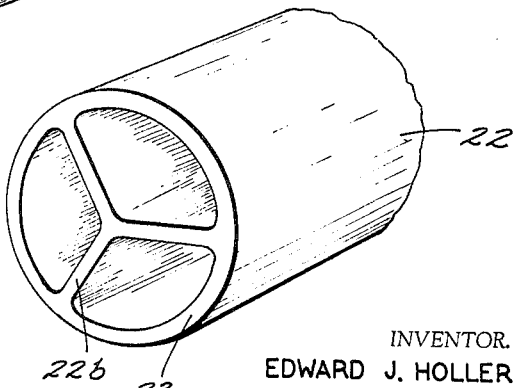
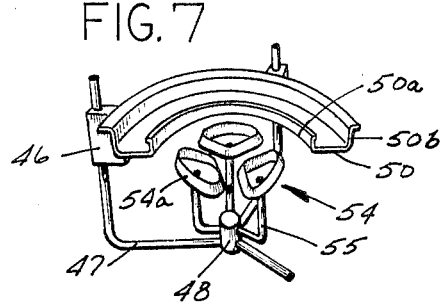
INVENTOR.
EDWARD J. HOLLER
BY W. A. SCHAICH &
E. J. HOLLER
ATTORNEYS United States Patent Office 3,240,583
Patented Mar. 15, 1966

3,240,583
METHOD AND APPARATUS FOR FORMING MULTIPLE-BORE TUBING
Edward J. Holler, Toledo, Ohio, assignor to Owens-Illinois Glass Company, a corporation of Ohio
Filed Jan. 2, 1963, Ser. No. 249,059
3 Claims. (Cl. 65—191)

The present invention relates to method and apparatus for producing drawn glass, and more particularly, to continuously forming glass or other molten material in the form of multiple-bore tubing by a drawing process.

Heretofore in the several known processes for forming multibore tubing from molten thermoplastic material such as glass, a large hollow body is mounted below the surface of the molten glass in fully immersed relation. The hollow body may have two or more upwardly-extending nipples adapted to introduce blowing air into the submerged root area of the drawn glass tubing. The large hollow body normally comprises a part of the molten glass container requiring an especially designed pot or forehearth. Usually an annular shaping sleeve projects downwardly into the molten glass above the nipple portion of the large hollow body in alignment therewith to facilitate drawing of multiple-bore tubing upwardly therethrough. The normal drawing process and apparatus require substantial modification of the pot or forehearth from which the tubular product is drawn converting from one size product to another. Alternatively, the art has utilized a partitioned hollow mandrel to facilitate the flow of glass through and around its forming surfaces during the formation of multiple-bore tubing. Obviously, the retention of such multiple-bore mandrel and controlling the delivery and viscosity of the molten glass during its formation have been serious restrictions in widespread adoption of this apparatus. The present invention obviates the prior art apparatus and method of tube drawing for continuously producing a multiple-bore product.

Accordingly, it is an object of this invention to provide an improved process and apparatus for continuously drawing thermoplastic material such as glass into multiple-bore tubing having at least two parallel longitudinal passages which are maintained completely separated from one another by an integral web or partition.

Another object of this invention is the rapid and accurate production of multiple-bore glass tubing from a mass of molten glass provided by a wide range of sources simply by contact and minimal penetration of an exposed surface thereof.

Another object of this invention is the provision of an up-drawing process and apparatus for continuously forming drawn glass tubing having a plurality of bores with controlled cross-sectional shape of the bores and exterior dimensions.

A further object of the present invention is to provide improved apparatus for upwardly drawing various sizes of multiple-bore glass tubing which is utilizable independently of the glass containing vessel and which is capable of expedient modification to convert from one size tubing to another.

A still further object of this invention is to provide an improved method of updrawing multiple-bore glass tubing from an exposed surface of molten glass by an independent heat-resistant shaping device having forming surfaces comprised essentially of noble metal having integrally connected divided cone and annular lenser portions.

The above and other objects are capable of expeditious attainment by employing my invention which embodies among its features drawing glass upwardly between the shaping device which is disposed in only partially submerged relation adjacent the surface of a pool of molten glass, and which device is comprised of essential noble metal components consisting of interconnected cone and lenser portions having horizontal surfaces disposed generally co-extensive with the glass surface with said cone portion having air admitting openings therein to form the plural passages of predetermined shape during the drawing process. The subject method and apparatus for updrawing a multi-bore product are utilizable fully independently of the molten glass container.

The specific nature of this invention, as well as other objects and advantages will become apparent to those skilled in the art from the following detailed description taken in conjunction with the annexed sheets of drawings on which, by way of preferred example only, are illustrated the preferred embodiments of the invention.

On the accompanying drawings:

FIG. 3 is a transverse sectional view taken along the line 3—3 of FIG. 2 at the root area of multiple-bore tubing drawn from apparatus constructed in accordance with FIGS. 1 and 2;

FIG. 4 is an enlarged fragmentary vertical sectional view of apparatus for initiating the tube drawing operation;

FIG. 5 is a fragmentary perspective view of double bore glass tubing drawn in accordance with the present invention;

FIG. 6 is a view similar to FIG. 5 showing the triple bore tubing; and

FIG. 7 is a fragmentary perspective view of one form of apparatus required to draw the triple bore tubing.

Figure 1:
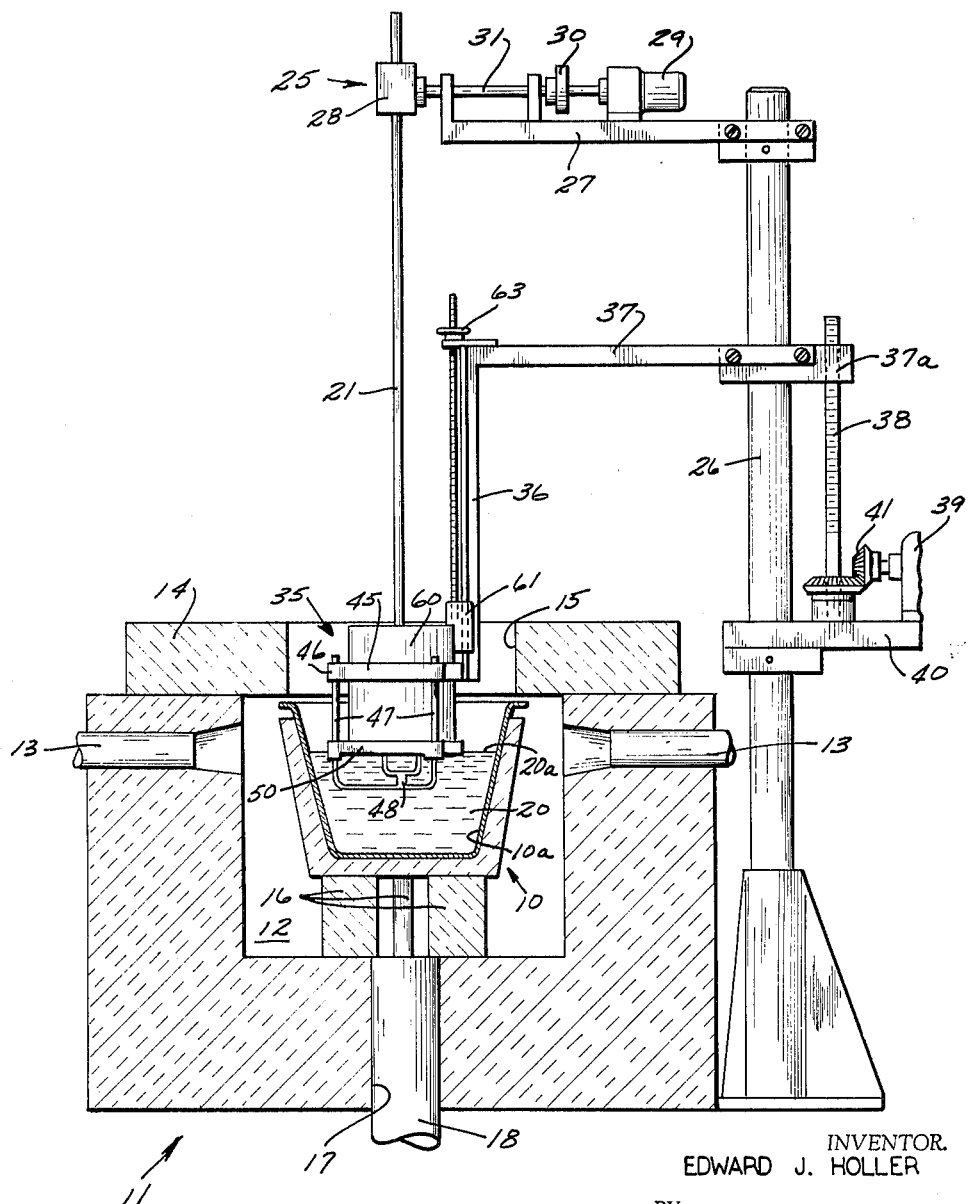
FIG. 1 is a side elevational view partially in vertical section through a tube drawing pot embodying one form of the present invention.

Referring to FIG. 1 of the drawings in detail, a drawing pot 10 is mounted within a suitable melting furnace 11 comprised of heat-resistant sidewalls. Drawing pot 10 is preferably circular in shape and has a continuous inner lining 10a comprised of noble metal such as platinum or platinum rhodium alloy. Many other types of molten glass retaining vessels or forehearths may be utilized in practicing the present invention.

Furnace 11 has a circular chamber 12 within which drawing pot 10 is centrally mounted. A plurality of inwardly directed radial burners 13 adapted to heat the molten glass contained in the drawing pot is mounted in the furnace side-walls. Furnace 11 is comprised of an annular top block 14 having a circular opening 15. The bottom of the furnace is provided with a series of spaced-apart support blocks 16 for supporting drawing pot 10, blocks 16 surrounding an axial opening 17 having an exhaust tube 18 mounted therein to remove burner combustion gases from the furnace.

Relatively large opening 17 disposed in the furnace bottom is located in axial alignment with surrounding pot support blocks 16 with a plurality of intermediate openings 19 interconnecting furnace chamber 12 and exhaust tube 18. Burners 13 are preferably of the radiant heat, gas-fired type capable of obtaining temperatures in the range of from 1300° to 3000° F. Exhaust tube 18 in the furnace bottom serves as a flue and leads to an exhaust stack to reduce updraft and convection currents directly above the furnace. A suitable eductor (not shown) is preferably utilized with tube 18 to control and maintain the control of exhaust gases from the furnace.

It is to be understood that the above-described furnace and drawing pot are simply one means of preparing the bath of molten glass 20 in refined and homogeneous condition with its surface exposed for drawing operations. The molten glass may similarly be retained in other types of continuous delivery forehearths, feeder bowls, or small tanks from which a lengthy cylindrical glass product is capable of being drawn continuously upwardly in accordance with the present invention.

A tractor mechanism 25 is supported above pot 10 by a stationary vertical column 26 disposed adjacent to furnace 11. Drawing mechanism 25 is mounted on a horizontal arm 27 positioned at the upper end of vertical column 26. Mechanism 25 comprises a cooperating juxtaposed pair of rotatable rolls 28 which are driven in any suitable manner and at a desired speed of rotation by an electric motor 29, for example, through a pair of gear wheels 30 and drive shafts 31. Two rolls 28 are preferably mounted in tandem in the same horizontal plane adapted to contact a rigid portion to draw tubing 21 upwardly therebetween. Other suitable drawing mechanisms known in the art can be similarly employed.

Drawing assembly 35 is mounted over pot 10 over the lower end of a vertically disposed arm member 36 which is rigidly attached to a cantilevered-removable arm member 37. Arm 37 is slidably mounted on column 26 and has a threaded opening 37a with a rotatable screw shaft 38 passing vertically therethrough to facilitate controlled vertical movement of the drawing assembly. A second electric motor 39 is stationarily mounted on a horizontal support plate 40 adapted to drive a set of bevel gears 41, one of which is keyed to rotatable shaft 38 to raise or lower drawing assembly 35 through vertical movement of arms 36 and 37. Normally the aforesaid driving mechanism serves to lower drawing assembly 35 at a controlled rate to maintain the forming surfaces of the drawing assembly and glass surface 20a in constant relation.

Drawing assembly 35 consists of an annular ring member 45 disposed in a horizontal plane rigidly attached to the lower end of vertical arm 36. Ring 45 has three spaced-apart blocks 46 rigidly attached exteriorly in equiangular relation with vertical openings therein to receive and retain three similarly spaced vertical arms 47 which extend downwardly. The three arms 47 interconnect in a lower central region to comprise a spider-like arrangement for retaining the glass shaping members in prescribed alignment in proximity to glass surface 20a. Arm members 47 extend downwardly a substantial distance beneath the glass surface and have horizontally inwardly directed portions which intersect at a central vertically arranged post 48 which extends upwardly from their point of connection. Each of the arms 47 has a second retention block 49 affixed to an intermediate portion to retain a shaping annular ring member 50 in proximity to the glass surface.

Figure 2:
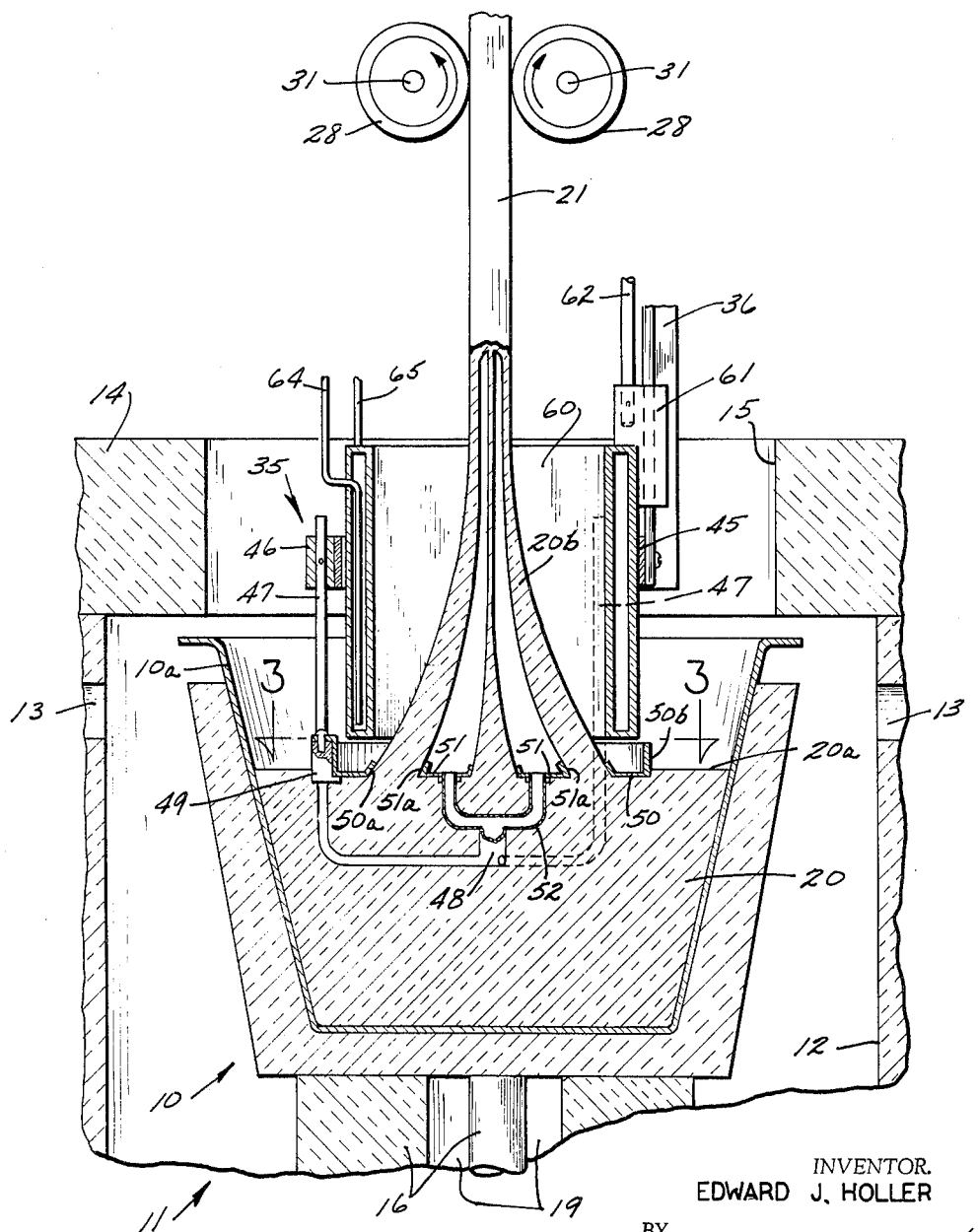
FIG. 2 is an enlarged vertical sectional view of the apparatus as shown in FIG. 1.

Ring 50 is positioned in generally parallel coextensive relation with respect to glass surface 20a and comprises a lenser to shape the exterior surfaces of the glass product as drawn. Ring 50 has a short vertical extent and cylindrically-shaped edges, the interior of which terminates in an upwardly and inwardly directed annular flange 50a as shown in FIG. 2. Ring 50 is firmly affixed in a horizontal plane to the series of retention blocks 49 mounted on the vertical portions of arm members 47. The exterior peripheral edge of ring 50 has a vertical cylindrical flange 50b to permit introduction of the ring or lenser into the molten glass at its surface to a variable degree to control wall thickness of the product, for example. Inner flange 50a is contoured to provide a smooth angular shaping surface for the exterior of the tubular glass product as drawn at its root area.

A divided plate member 51 as shown in FIG. 2 is mounted centrally within ring or lenser 50 with its horizontal surfaces substantially in the same horizontal plane as ring 50. Plate member 51 is comprised of two similar semi-circular shaped half sections which are supported by a vertically-disposed U-shaped hollow arm member 52 which is in turn supported at a central lower region by rigid post 48. Divided plate or disc 51 has upwardly and inwardly-directed peripheral flanges 51a surrounding each of its similar half sections which serve to shape the inner surfaces of the several bores of the tubular glass part as drawn. Thus, it is readily apparent that divided cone 51 and lenser 50 have extensive horizontal surfaces with juxtaposed upwardly and inwardly directed flanges 51a and 50a respectively which provide an open annulus with a central open bisecting region through which multi-bore glass tubing is drawn. The spider-like arrangement of three arms 47 extends substantially below the surface of the molten glass a sufficient distance to permit mounting of cone supporting arm 52 thereabove and to avoid conflict or interference with drawing of the molten glass and to minimize the development of objectionable interior bore surface characteristics in the drawn product. Divided cone, surrounding lenser and arms 47, 52 and mounting post 48 all of which are immersed in the molten glass are preferably fabricated of heat and corrosion resistant material such as noble metal or metal alloy. Fabricating these elements of plantinum or platinum-rhodium alloy, for example, is preferred in practicing the present invention.

A cooling sleeve 60 consisting of a hollow cylindrical jacket is mounted immediately above annular ring 50 preferably out of contact and in coaxially aligned relation therewith. Sleeve 60 is mounted independently of and within ring 45 supported in vertically movable arrangement on slidable support block 61 which is vertically operable on rigid arm 36. Support block 61 has a screw-threaded shaft 62 attached thereto which extends vertically upwardly parallel to arm 36. A threaded adjustment knob 63 as shown in FIG. 1 is attached to the upper end of shaft 62 to operate in conjunction with an extension of horizontal arm 37 to control the relative disposition of cooling jacket 60 with respect to the other working elements of drawing assembly 35. Sleeve 60 is provided with inlet and outlet lines 64 and 65 respectively adapted to supply a continuous stream of cooling water or other coolant internally of its inner chamber. Cooling jacket 60 is normally positioned to surround the root area 20b of the multibore product in order to condition and initiate solidification of the drawn tubing during its upward elongation into final form.

FIGURE 2 illustrates the relative disposition of the shaping surfaces of divided cone and lenser members 51 and 50 respectively in a typical drawing operation. Radially and upwardly extending arm members 47 are shown essentially fully immersed beneath cone and lenser members and extending to a substantial depth within the molten glass. The depth of immersion of arms 47 within the molten glass is governed by the relative sizes and vertical disposition of the cone and lenser members having their horizontal surfaces preferably disposed in the same horizontal plane closely adjacent glass surface 20a. The relative coaxial and vertical locations of the cone and lenser may be slightly varied as desired or required in producing various shapes of products.

FIGURE 3 illustrates in a horizontal sectional view the root area 20b of a typical multi-bore tubular glass product 21 as drawn. It is readily observed how the molten glass is drawn upwardly between the vertically disposed inwardly and upwardly flared juxtaposed short flanges 50a and 51a of the lenser and cone elements. Also the similar semi-circular shaped half sections 51, which constitute the cone member, are spaced apart a prescribed distance with their flat sides facing each other to facilitate drawing a continuous web or partition integrally within the drawn product. These edges are also flanged upwardly to provide smooth shaping surfaces for departure of the molten glass therefrom.

FIGURE 4 illustrates one embodiment of the procedure for intiating the drawing of a multi-bore tubular glass product. A bait 70 is positioned over and in contact with both halves of cone member 51 when the drawing assembly 35 is lowered into contact with the molten glass. When the molten glass contacts the downwardly extending annular flange 70a and downwardly extending bisecting flange 70b of bait 70 with split cone and lenser members 51 and 50 properly positioned in proximity to glass surface 20a, the bait is raised by a connecting line or wire 71 so that adhering glass will follow and subsequently be engaged by drawing device 25. Wthdrawal of the glass through the lenser 50 and around and between the several portions of cone 51 causes additional glass to flow into and around the region from which the molten glass is dispaced and arm members 47 and 52 do not retard such flow. Thus, the open annulus between the shaping members called the cone-to-lenser opening having the shape of the Greek letter theta ($\theta$) is continuously supplied with fresh glass from the molten mass therebelow to provide completely homogeneous and refined molten glass to the drawing apparatus for fabricating a high quality uniform product. As the glass is drawn upwardly under the influence of the tractor device, sections of desired length are severed and ambient air enters the tubular product from the upper open end of the column. It has been found in fabricating a wide range of sizes utilizing different combinations of cone and lenser members that only very small volumes of blowing medium are required and inherent variables in the drawing process are primarily governed by the molten glass temperature and its physical properties, the relative disposition of cone and lenser members with respect to the glass surface and the drawing rate.

The use of a small amount of low pressure air having a pressure of 1 to 2 p.s.i. gauge internally of the tubular product as drawn is preferred to shape the tubing in practicing the present method. The column of quiescent air delivered internally of the several bores exerts a uniform pressure on the internal surfaces of the glass product in the root area so that by maintaining a constant rate of pull upwardly on a solidified region of the tubular product, the workable root area is uniformly acted upon by all factors affecting tube formation. Actually ambient air surrounds the glass tube from the root to a point where the product emanates from the furnace. The gaseous blowing medium such as air is supplied through arm members 47, post 48 and U-shaped arm member 52 all of which are hollow and connected to a source of blowing air to introduce the same into the root area 20b. It has been found that blowing air having a pressure of generally less than several pounds per square inch pressure above atmospheric is usually required in making a wide range of sizes.

The present method may be summarized as follows:

Raw batch or cullet is placed within melting pot 10 and reduced to a liquid state by heating. Melting temperatures in the range of 2200° to 3000° F. are employed for most common glasses to keep the melting and refining time to a minimum so that individual batches can be melted, stirred, fined and cooled to allow tubing to be drawn the same day. Obviously, some glasses require longer melting and fining periods than others following which the glass is cooled to the proper drawing temperature taking proper safeguards to prevent the formation of a crust of more viscous glass on the surface of the melt. Glass temperature is observed at the center of the melt preferably with an optical pyrometer, and when approximately 100° F. above the starting temperature, the drawing assembly is brought into contact with the surface of the glass at the center of the pot. The surrounding cooling jacket is then mounted and lowered until spacer elements (not shown) on its bottom region contact an upper region of the lenser. The spacer legs are then adjusted so that a short space exists between the bottom of the water cooler and the lenser.

The following procedure is utilized in drawing glasses which are not particularly susceptible to devitrification. After the prescribed drawing assembly is mounted in proper relation to the glass surface with the glass at the proper drawing temperature, the starting bait is raised very gradually and the assembly lowering device is started at a prescribed rate to maintain the cone and lenser members at the glass level during drawing of the tubular product. The furnace is adjusted to maintain the glass temperature within the prescribed working range. The drawing rollers and the guide are aligned so that the tubing is drawn perpendicular to the assembly cone and lenser and preferably without angular rotation of the product. Other variables are controlled to produce the desired tube dimensions. Each portion of the cone member is utilized to form the inside cavity of an individual bore of the tubing. The distance between the cone outside diameter and the lenser inside diameter between which the glass is drawn provides a cone-to-lenser opening to form tubing of prescribed exterior wall thickness and contour. The spacing between the several portions of the cone is adjusted to provide the formation of a continuous internal web or partition of prescribed thickness and contour.

As shown in FIG. 5 tubing 21 has essentially uniform sidewalls 21a and partitioning web 21b. Maintaining the upper solidified region of the tubing in a non-rotated state during the drawing operation permits formation of the several bores having parallel longitudinal extent. Rotation of the upper contacted region of the tubing during drawing permits formation of the central web in a helical pattern internally of the product. The drawn tubing may have either an essentially eliptical external contour with more nearly circular or slightly eliptical passages as viewed in cross section or the exterior contour may be maintained essentially circular with the internal passages having a more definite semi-circular cross-sectional configuration.

The lowering device is continually operated during the drawing cycle for maintenance of the drawing assembly in constant relation to the glass level. As the lower extremities of arms 47 approach or contact the bottom of the pot or vessel the cycle is ended. Where a stream of glass is delivered into the drawing vessel such as a forehearth or feeder, the lowering device may or may not be operated as required to achieve the above desired stable conditions.

As shown in FIGS. 6 and 7 cone member 54 is comprised of three similar sector-shaped portions 54a. Each portion 54a is supported by an upwardly-extending L-shaped arm member 55 which interconnects with central post 48. Ring member 50 surrounds three-segmented cone member 54 as described hereinabove. Drawing molten glass upwardly utilizing such cone member permits fabricating on a continuous basis a glass product 22 as shown in FIG. 6 having three parallel longitudinal passages each having an arcuate cross-sectional contour. The exterior sidewall of this triple bore product is essentially uniform and the three equi-angular centrally-interconnecting webs 22b have essentially the same or slightly varying dimensions.

In making larger sizes of multibore tubing it is possible to form four or more central bores within the product by further partitioning of the internal cone member. In each case it is preferred that each segmental portion of the cone have a source of pressurized gaseous fluid delivered thereto to prevent collapse of the bore and to permit control of wall thickness.

Various modifications may be resorted to within the spirit and scope of the appended claims.

I claim:
1. In an apparatus for drawing multiple-bore glass tubing, the combination comprising
   a container for retaining a mass of molten glass,
   an integral hollow shaping device mounted within said container and having essentially co-planar shaping surfaces disposed adjacent the surface of said molten glass, said shaping device comprising at least two heat-resistant segmented disc members and a surrounding annular ring member integrally joined by a plurality of rigid arm members extending substantially below the molten glass surface, each said disc member having a surrounding upwardly-extending annular flange extending above the molten glass surface, said ring member having inner and outer upwardly-extending annular flanges extending above the molten glass surface, and means for drawing the molten glass upwardly through said shaping device at a controlled rate to form a uniform product.

2. The combination set forth in claim 1 wherein said annular ring member has a circular shape and said disc members are semi-circular in shape.

3. The combination set forth in claim 1 including means for introducing a gaseous stream internally of each said disc member through at least one of said rigid arm members.

References Cited by the Examiner

UNITED STATES PATENTS

| | | | |
|---|---|---|---|
| 1,386,441 | 8/1921 | Spinasse | 65—188 X |
| 1,868,397 | 7/1932 | Salomon | 65—189 |
| 2,002,875 | 5/1935 | Woods | 65—88 |
| 2,131,417 | 9/1938 | Danner | 65—187 X |
| 2,233,435 | 3/1941 | Snow | 65—2 |
| 2,300,736 | 11/1942 | Slayter et al. | 65—2 |
| 2,450,115 | 9/1948 | Byrnes | 65—192 X |

FOREIGN PATENTS

| | | |
|---|---|---|
| 25,560 | 1/1923 | France. |
| 1,196,712 | 5/1959 | France. |
| 972,085 | 5/1959 | Germany. |
| 675,700 | 7/1952 | Great Britain. |

DONALL H. SYLVESTER, *Primary Examiner.*